(No Model.)
W. BOUGHTON.
VEHICLE SPRING COUPLING.
No. 472,724.            Patented Apr. 12, 1892.
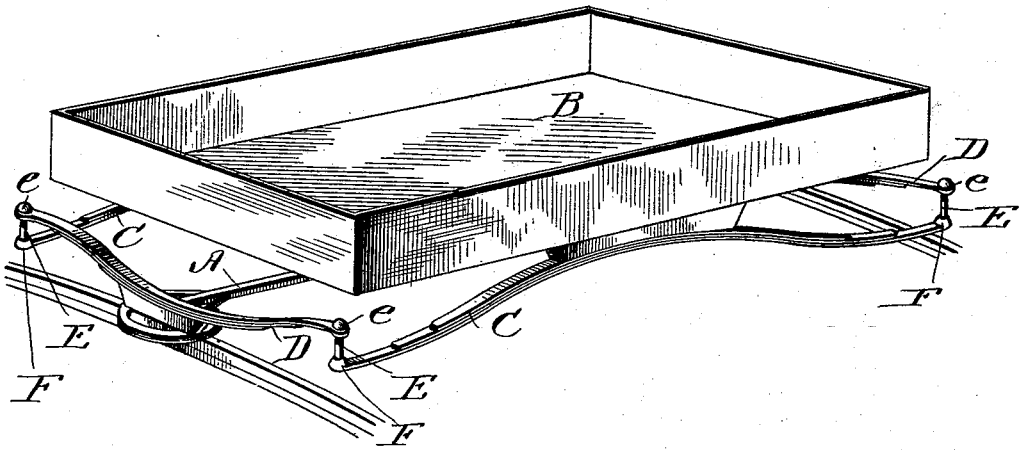
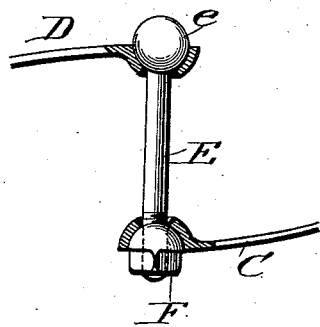 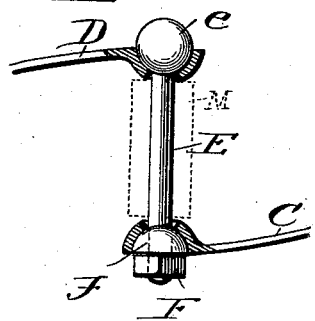
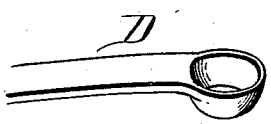
Witnesses
Inventor
William Boughton,
By his Attorneys ately with the parts C and D. The coupling or connecting bar E is provided with ball e on one end and is threaded at its opposite end, which receives the nut F. When the nut F is used alone, its working face is semispherical to correspond with the ball-socket in one of the parts C and D; but if a washer f is used the nut may be of usual construction and the washer will be semi-spherical on its working face.

UNITED STATES PATENT OFFICE.

WILLIAM BOUGHTON, OF MANSFIELD, OHIO.

VEHICLE-SPRING COUPLING.

SPECIFICATION forming part of Letters Patent No. 472,724, dated April 12, 1892.

Application filed July 6, 1891. Serial No. 398,568. (No model.)

*To all whom it may concern:*

Be it known that I, WILLIAM BOUGHTON, a citizen of the United States, residing at Mansfield, in the county of Richland and State of Ohio, have invented certain new and useful Improvements in Vehicle-Spring Connections or Couplings; and I do hereby declare the following to be a full, clear, and exact description of the invention, such as will enable others skilled in the art to which it appertains to make and use the same.

This invention relates to connections or couplings for vehicle-springs, and aims to replace the connections generally employed for connecting the ends of springs with the bolsters or with the side bars, be the latter rigid or spring, and for connecting the ends of springs with any portion of the vehicle-body or running-gears, whereby a universal hanger or connection is had to permit the body to swing in all directions to adapt itself to the direction of strain or jolt.

The improvement consists of the novel features and the peculiar construction and combination of the parts, which will be hereinafter more fully described and claimed, and which are shown in the annexed drawings, in which—

Figure 1 is a perspective view of a platform running-gear embodying my invention. Fig. 2 is a detail section showing the application of the invention on a larger scale. Fig. 3 is a section similar to Fig. 2, showing a modification in the employment of a semispherical washer between the ball-socket in the spring and the nut on the connecting or coupling bar. Fig. 4 is a detail perspective view of one end of the spring, showing the ball-socket formed therein. Fig. 5 is a view similar to Fig. 4 of the opposing end of the spring or part to which the aforesaid spring is connected.

The reach A, platform B, and the springs C and D are of well-known construction and arrangement and are shown simply to illustrate the application of the invention. Obviously the springs C may be any part of the vehicle or running-gear to which the springs D or their equivalent are usually attached.

The gist of the invention is ball-sockets in the ends of the parts C and D. The coupling or connecting bar E is provided with ball e on one end and is threaded at its opposite end, which receives the nut F. When the nut F is used alone, its working face is semispherical to correspond with the ball-socket in one of the parts C and D; but if a washer f is used the nut may be of usual construction and the washer will be semi-spherical on its working face.

In assembling the parts the connecting or coupling bar is thrust through openings in the ball-sockets in the parts C and D, and the nut or the washer and nut are applied to the threaded end. The openings in the parts C and D are sufficiently large to permit the coupling or connecting bar to play freely, whereby the vehicle-body is free to swing in any and all directions. The ball-sockets are pressed in the parts C and D, thereby attaining the desired end without making the parts unnecessarily heavy. Obviously by this connection a quarter-spring can be used and placed at any angle on the body or gear; also, the end of one spring being directly under the other gives it a bearing that is direct and will not cause the springs to twist and break, as it would if the bearing was at the edge or side of spring, the hanger passing directly through the end of spring, giving the ball a bearing that will not twist the spring. The coupling-bar is provided with a spring or rubber buffer, which comes between the springs, as shown by the dotted lines M in Fig. 3, to prevent the coupling from jumping and rattling.

Having thus described my invention, what I claim, and desire to secure by Letters Patent, is—

1. In a vehicle-spring, the combination, with the parts C and D, having ball-sockets in their exterior sides, of a coupling-bar having a ball at one end to fit in a socket in one of the parts and having its other end threaded, and a part adjustable on the threaded end of the said bar and having a semi-spherical working face to work in the socket in the other part, substantially as and for the purpose described.

2. The combination, with the end springs

D and the side springs C, having ball-sockets in their ends, of single straight coupling-bars having a ball at one end to fit in a socket of one of the springs and having the other end threaded, and parts adjustably mounted on the threaded ends of the said coupling-bars and having semi-spherical working faces to fit in the sockets of the other or corresponding parts, substantially as shown and described.

In testimony whereof I affix my signature in presence of two witnesses.

WILLIAM BOUGHTON.

Witnesses:
JESSE E. LA DOW,
C. STELLA CLIFFORD.